INVENTORS:
JOHN C. MACK,
ROBERT J. BAIER,
BY Matthew P. Lynch
ATTORNEY

INVENTORS:
JOHN C. MACK,
ROBERT J. BAIER,
BY Matthew P. Lynch
ATTORNEY

United States Patent Office

3,420,072
Patented Jan. 7, 1969

3,420,072
POWER TRANSMISSION SYSTEM
Robert J. Baier, Claymont, Del., and John C. Mack, Westtown, Pa., assignors to The Boeing Company, Seattle, Wash., a corporation of Delaware
Filed Jan. 5, 1967, Ser. No. 607,487
U.S. Cl. 64—1                     12 Claims
Int. Cl. F16c 1/00

ABSTRACT OF THE DISCLOSURE

A power transmission system having a drive shaft and a dual shaft arrangement, the inner dual shaft is secured to the drive shaft at a combined system nodal point and a viscous shear damper is secured to the outer dual shaft at an antinode.

---

This invention relates to high-speed shafting and, more particularly, to a method and apparatus for transmitting torque while controlling the deflections of shafts operated at supercritical speeds.

For any rotating shaft, there exists a series of discrete speeds at which the centrifugal forces resulting from shaft unbalance cause progressively greater shaft deflections. At these speeds, the elastic restoring forces developed as the shaft deflects are less than the centrifugal forces developed by the deflected shaft and, therefore, deflections increase until stopped by physical structure surrounding the rotating shaft, or until the shaft fails. The discrete and predictable shaft speeds at which this phenomenon occurs are called critical speeds.

Shafts capable of rotating at supercritical speeds have many advantages in power transmission systems. A basic advantage is the permissive use of smaller diameter shafts and their inherent reduction in weight. Weight reduction is a constantly sought but elusive quality that is highly desirable in power transmission systems, particularly in aircraft. The use of smaller diameter shafts is possible because of the lower torque experienced by a small diameter shaft as compared to a large diameter shaft when transmitting the same power at the same stress level. Additionally, when large diameter shafts are utilized, they require a plurality of weighty couplings along their lengths to join the many sections of shaft required. These weighty couplings can be eliminated by using a single integral small diameter shaft. Supercritical schafting is especially desirable for use in helicopters, where shafts transmit power the entire length of a fuselage or wing.

A shaft, when rotated above its first critical speed, is considered to be operating within the supercritical range. When operating within the supercritical range, the shaft will have certain points along its lengths that are free from displacement. The displacement-free points are called node or nodal points and are located a variable distance in from the ends of the shaft. These nodal points will move nearer the ends of the shaft as higher modes (speeds above the first critical) are encountered; but, regardless of the speed of operaiton, the end of the shaft, if free, will always move in an orbit proportional to the mode and the amount of unbalance present in the shaft. It is a known fact that the free end of a shaft operating above its first critical speed is displaced a maximum amount relative to the entire shaft. The free end of the shaft is, therefore, the location of an antinode and is (for most applications) the most desirable place to position a damper. The displacement amplitude that would be felt by a damper located at any other position along the length of the shaft is dependent upon its position relative to the free end of the shaft or other antinode for specific speeds of operation. The location of an antinode other than at the free end of the shaft will shift depending upon the shaft's rotational speed. Therefore, the optimum damper position other than at the end of the shaft will be different for each critical speed.

In view of the above, it is obvious that a major problem exists in transferring torque from a deflecting drive shaft to a driven shaft or to a transmission without the usual transfer of vibration causing deflections. Since it is clear that the most desirable location for placing a damper is at the end of the shaft, an additional problem is to transfer the torque of the shaft while permitting its end to remain free in order to provide for a damper to repress the deflections.

The design of a power transmission system establishes the critical speeds to be encountered within limits in various operations. When the critical speeds are known, it is possible to determine the location of the nodal points. It has been determined that, within the operating range, the nodal point nearest the free end of the shaft is the most desirable place to locate a coupling means to transmit the torque to an output. The nodal point will rotate on dead center, substantially free of displacement. Therefore, by providing a dual shaft arrangement whereby displacement is transmitted to a main shaft which is damped at an antinode while a second torque shaft is attached to and picks up the torque at a natural node point, torque can be transferred without the usual transfer of deflection. This is particularly important since deflections in the combined drive system when transferred to a driven means cause vibration in the driven means. While the utilization of a dual shaft arrangement located at a nodal point will permit torque that is substantially displacement-free to be transmitted, damping means must be provided to control the lateral displacement in the main shaft. It has been determined that lateral displacement of shafts operating at critical speeds can be controlled by the proper use of dampers which extract energy from the shaft. It has been further determined that the most efficient type of damper is the type which utilizes the whirling motion of the shaft to actuate the elements of the damper and thereby dissipates the unwanted energy. This is easily accomplished at low speeds where the amplitudes are relatively high with low inertia forces. However, as high speeds are approached, the amplitudes are reduced to very small values, and lost motion between the shaft and the damper elements together with the high inertia loads may prevent the damper from performing in a satisfactory manner. Therefore, in order to dampen the shaft displacements in the most efficient manner, the damper should be located on the shaft at a point which makes it insensitive to the operating speed of the shaft. This result is achieved by locating the damper at a point on the shaft where there is always an antinode, regardless of the critical speed. One known antinode point which remains constant through all critical speeds is located at the free end of the shaft.

In summary, the present invention solves the aforesaid problems by providing a dual shaft arrangement for picking up the torque from a supercritical main driving shaft at a nodal point and providing a damper at an antinode on the dual shaft arrangement for subduing the deflections without being affected by shaft speed variations or temperature changes.

Many types of dampers have been developed over the years; however, all have certain inherent disadvantages when utilized with supercritical speed shafts. A major disadvantage is their sensitivity to environmental conditions and temperature fluctuations. It has been determined that a viscous shear damper is the most efficient type of damper for repressing the deflections in dual shaft power takeoff applications of supercritical speed shafting. This is because a viscous shear damper derives its damping characteristics from the resistance offered to shear by a liquid film between two surfaces in close proximity and because the shear qualities of the liquid film can be matched to the environment in which it is to be used. Additionally, the linear damping coefficient supplied by viscous shear dampers comes closest to matching the damping requirement of a shaft rotating at supercritical speeds. This is because the linear damping coefficient is proportional to velocity.

The resistance of the viscous fluid to shear depends upon the viscosity of the fluid and the relative velocity of the shearing surfaces. A major disadvantage in all known viscous shear dampers is the variation in the resistance of the fluid to shear due to a change in the viscosity of the fluid because of temperature fluctuations. In order to effectively utilize the beneficial properties of the viscous shear damper while eliminating its undesirable features, a viscous shear damper has been developed which utilizes a stacked array of damper discs with a viscous fluid acting as a separation medium between the discs. The discs are maintained with a pre-determined space therebetween to allow the viscous damping fluid to fill the areas between the discs. The discs are constructed from temperature-sensitive, bimetallic material. This unique innovation allows the discs to deflect as the temperature fluctuates, and thereby controls the space between the discs and provides automatic control of the damping coefficient at all temperatures.

An object of this invention is to provide a method of transferring torque at critical speeds without transferring deflections.

Another object of this invention is to provide a method of transferring torque at critical speeds while damping out deflections.

Another object of this invention is to provide a deflection-damped power transmitting system.

Another object of this invention is to provide a power transmission system wherein torque can be transferred at critical speeds without vibration-causing deflections.

Another object of this invention is to provide a damper that is insensitive to the operating speed of the shaft.

Another object is to locate a damper on a shaft at a point which provides an antinode at all speeds.

Another object is to transmit torque from a shaft while allowing the end of the shaft to remain free.

Another object is to provide a means of coupling a driven shaft to a driving shaft at a nodal point.

Another object is to provide a viscous shear damper that compensates for temperature changes.

Another object is to provide a damped bearing support which can be matched to the shaft requirements and incorporates features which minimize the effects of environment on performance.

Another object is to provide a supercritical speed shaft that is light in weight and has high reliability.

Another object is to provide a viscous shear damper which can be matched to its environment.

Further objects and advantages of this invention will be brought out in the following specification wherein, for the purpose of completeness of disclosure, a preferred embodiment has been described in detail, without intending to limit the scope of the invention as set forth in the appended claims.

The attached drawings illustrate the preferred embodiment of the invention, in which.

Figure 1:
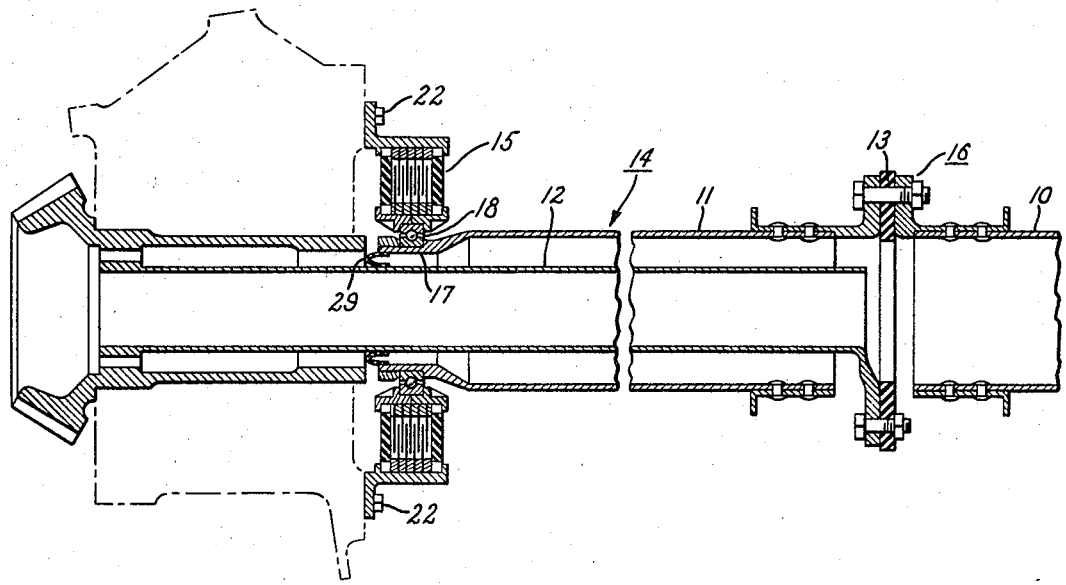
FIGURE 1 is a top cut-away view of a power transmission system utilizing this invention.

Referring now to the drawings, wherein like reference numbers designate like or corresponding parts throughout the several views, there is shown in FIGURE 1, a main drive shaft 10 drivably secured to a damped dual drive means 14 end to end in a longitudinal relationship by a coupling means 13. The coupling means 13 is positioned at a nodal or node point 16 located along the length of the combined drive system, as shown best in FIGURE 2.

Figure 2:
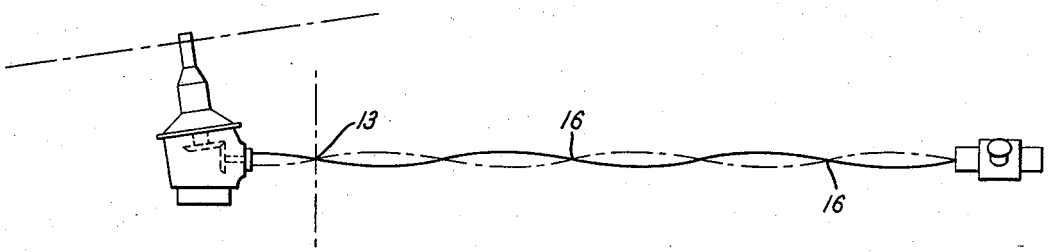
FIGURE 2 is a diagrammatical representation of a supercritical speed shaft.

It has been determined that the nodal point nearest the free end of the combined drive system is the most desirable and efficient place to locate the coupling means 13. A node point 16, such as shown in FIGURE 2, is a point on a shaft which rotates about its mass center, free of displacement at critical speeds. The coupling means 13, as shown in FIGURE 1, is one of many types that are capable of transmitting torque while allowing misalignment.

The damped dual drive means 14 comprises an outer damped shaft 11 and an inner torque shaft 12. It will be noted that the damped shaft 11 is concentric to the torque shaft 12 and surrounds it along a portion of its length. One end of the damped shaft 11 is secured to the coupling means 13 and its opposite free end 17, which is necked down and provides a constant antinode, is secured to a damper means 15 by a shaft bearing 18 in a manner hereinafter described. The torque shaft 12 is mounted within the damped shaft 11 and secured on one end to the coupling means 13. The opposite free end of the torque shaft 12 is adapted to drive a transmission or other similar mechanism. Mounted between the necked-down end 17 of the damped shaft 11 and the torque shaft 12 is an annular seal 29. The seal 29 is positioned at a point adjacent the free end 17 of the damped shaft 11.

The damper means 15, as shown in FIGURE 1, serves a dual purpose in damping out displacements and providing a shaft end support for the damped shaft 11. The damper means 15 is of the viscous shear type, wherein the shear rate is defined by the quotient of the relative velocity of two shearing surfaces divided by the distance between the two surfaces. In the present invention, the damper 15 which is shown in greater detail in FIGURE 3 comprises a pair of annular, symmetrical bearing and damper drive housing halves 20 and an annular outer housing 24. The drive housing halves 20 and the outer housing 24 are held in aligned complementary relationship by a pair of annular centering washers 23. The centering washers 23 are comprised of an annular portion of rubber or other elastomer compound which is vulcanized or otherwise bonded between an inner annular ring 28 and an outer annular ring 27. The centering washers 23 are press-fitted between the drive housing 20 and the outer housing 24 adjacent the outer ends thereof to form a liquid-tight compartment 31. In order to retain the centering washers 23 between the drive housing 20 and the outer housing 24, the housings are provided with flanges 30 along the outer edges thereof which abut the rings 27 and 28. In addition to providing a separating and aligning medium between the housings 20 and 24, the centering washers 23 serve to prevent the leakage of fluid from the compartment 31 and the contamination of the compartment 31 by external substances.

Mounted within the compartment 31 in complementary interleaved relationship are a plurality of inner damper discs 21 and outer damper discs 26. The damper discs 21 and 26 are adapted to provide constant damping characteristics over a wide range of operating temperatures and conditions. The constant damping characteristics of the damper 15 are due to the construction of the damper discs 21 and 26 which act to vary the distance between each other depending upon temperature. Since the shear rate or damping characteristics of the damper 15 are defined by the quotient of the relative velocity between the inner damper disc 21 and the outer damper disc 26 divided by the clearance between the adjacent inner and outer damper discs 21 and 26 respectively, the ability to control at least one of the damping parameters is important. The importance of controlling at least one of the damping parameters of the damper is obvious in view of the fact that virtually all practical damping fluids are subject to wide variations in viscosity depending upon its temperature. The damping obtained from a shear damper is directly proportional to the viscosity of the damping fluid; in other words, the ratio between the viscosities of the damping fluid at any two temperatures is also the ratio between the damping characteristics of the fluids at those temperatures. As an example of the dramatic change in the damping characteristics of a damping fluid due to temperature, consider SAE 30 petroleum oil, the viscosity of which varies from 100 centistokes at 100° F. to 15,000 centistokes at 0° F.; this variance in viscosity changes the daming characteristics by a factor of 150.

Figure 3:
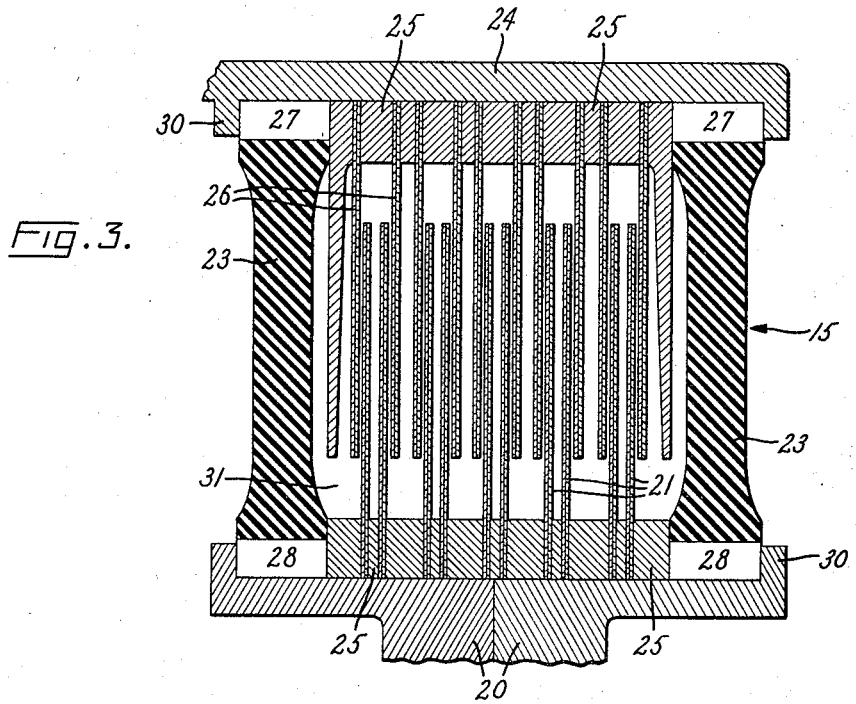
FIGURE 3 is a sectional cut-away view of the damper illustrating its minimum space between discs when in its hot operating condition.
Figure 4:
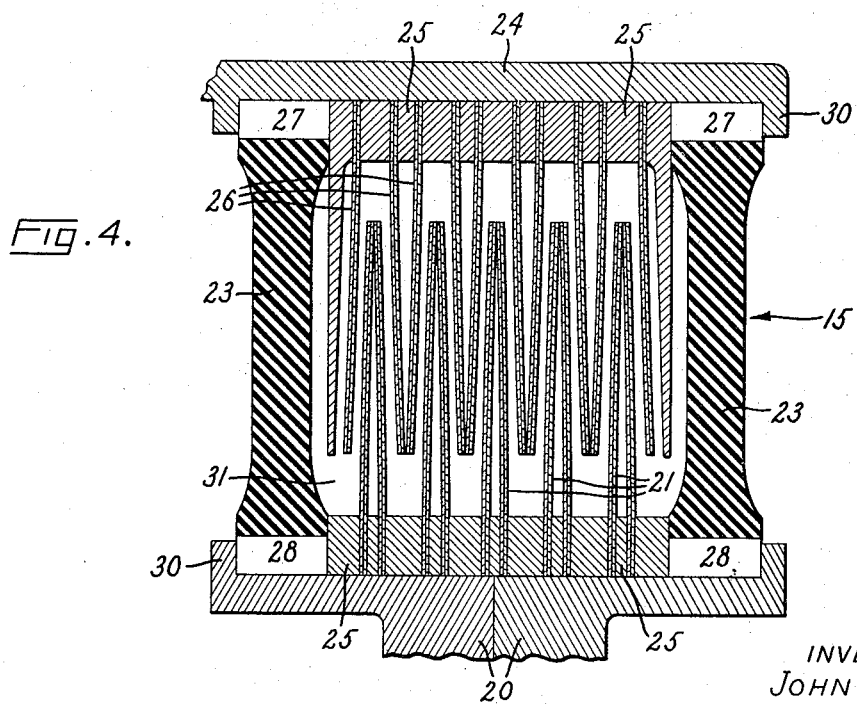
FIGURE 4 is a sectional cut-away view of the damper illustrating its maximum space between discs when in its cold operating condition.

In order to compensate for the wide variance in the viscosities of the damping fluids at various operating temperatures, the damper discs 21 and 26 have been designed to automatically provide a counteracting change in one of the shear rate parameters of the damper 15. Referring now to FIGURE 3, it will be noted that the inner damper discs 21 are mounted in abutting relationship to the drive housing 20 and are retained in their aligned relationship by a plurality of spacers 25 and a bolt (not shown) extending through the drive housing halves 20. Mounted in abutting engagement with the outer housing 24 in complementary staggered relationship to the inner discs 21 are the outer damper discs 26. The outer damper discs 26 are separated by the spacers 25 and held in their aligned relationship by flanges 30. The flanges 30 and the spacers 25 serve to keep the centering washers 23, the inner damper discs 21 and the outer damper discs 26 in complementary aligned relationship. In their complementary interleaved relationship, the damper discs 21 and 26 are provided with a space therebetween. This space, as shown best in FIGURES 3 and 4, is filled with a viscous fluid. It is the shear characteristics of this viscous fluid under the reciprocating action of the interleaved damper discs 21 and 26 which provide the damping qualities of the damper means 15. The viscous damping fluid is retained within the compartment 31 and, consequently, between the damper discs 21 and 26 by the centering washers 23. In addition to providing a liquid-tight compartment, the centering washers 23 further provide a spring rate between the drive housing 20 and the outer housing 24, which tends to center the inner and outer damper discs 21 and 26. The spring rate, or hysteresis damping, which is inherent in the centering washers 23 should be combined with the viscous damping of the discs when calculating damper size. The centering washers 23 serve a still further purpose in acting as a key or friction brake to prevent the rotation of the inner discs 21 due to the frictional action or whirling of the shaft bearing 18. The shaft bearing 18 is mounted between the split halves of the drive housing 20 and held in frictional engagement therebetween by a bolt (not shown) through the split halves. The bearing 18 is adapted to engage and secure the outer damped shaft 11 to the damper means 15.

In order to compensate for the wide variance in the viscosities of the damping fluids at various operating temperatures and to provide a constant damping coefficient to the damper irrespective of environment and temperature, the damping discs 21 and 26 are constructed from a bimetallic material. By the selective and judicial use of bimetallic materials in the damper discs 21 and 26, the clearance between adjacent discs will be automatically varied in accordance with the operating temperature of the damping fluid. During initial or cold operation, as shown in FIGURE 4, the inner damper discs 21 are bowed toward and contact the nearest adjacent inner disc and the outer damper discs 26 are bowed toward and contact the nearest adjacent outer disc. In this condition, the space between the interleaved inner and outer discs 21 and 26 is at a maximum. As the temperature of the damper 15 and the damping fluid approaches its normal or hot operating condition, the discs 21 and 26 tend to separate and straighten until a substantially parallel relationship is reached between the adjacent interleaved inner and outer damper discs. As the discs straighten, the space between the adjacent inner and outer discs decreases, thereby reducing the amount of damping fluid which is retained between the interleaved inner and outer damper discs 21 and 26 and providing a constant shear rate during varying temperature conditions.

As mentioned hereinbefore, as the viscosity of the damping fluid increases, its resistance to shear decreases; therefore, in order to compensate for the variance in the viscosity and shear resistance of the damping fluid during operation, one of the damping parameters of the damper 15 must be controlled. It is obvious that since the damping characteristics of the damper 15 are defined by the quotient of the relative velocity between the interleaved discs 21 and 26 divided by the space between the adjacent interleaved discs, the damping characteristics of the subject damper are automatically controlled by the action of the bimetallic discs in varying their respective clearance.

It is an important feature of this invention that the damper be capable of automatically adjusting for varying temperatures, different environments, and changing load conditions. It will be obvious from the above discussion that, by using bimetallic discs to vary the space between adjacent discs, depending upon the environment and temperature conditions under which the damper will operate, any one of a number of commonly known liquids can be used to provide the shear resistance necessary to absorb the deflections in that shaft 11 during all operating conditions. Additionally, it will be obvious to those versed in the art of damping out displacements and transmitting torque with supercritical speed shafts that the described embodiment will effectively and efficiently accomplish the purpose for which it is intended due to the picking up of the torque of the driving shaft 10 at the node point 16 by a damped shaft 11 and a torque shaft 12 in such a manner as to damp out the shaft displacements with the damper 15, thereby allowing the torque shaft 12 to provide displacement-free transmission of power. As described hereinbefore, the free end of a shaft rotating at supercritical speeds provides a continuous and constant antinode regardless of the critical speed at which the shaft is rotating. It is important to this invention to have the damper means 15 located at an antinode in order to provide the most effective and efficient damping action of the orbital displacements, which are inherent at all points on a supercritical speed shaft with the exception of node points 16. Since the most effective damping action will occur at the point of greatest orbital displacement, it is an important concept of this invention that the damper means 15 be mounted on the free end of the shaft 11. The damper means 15 can be secured to a fixed abutment by virtue of a bolt 22 which extends through the outer housing 24. In operation, the displacements from the drive shaft 10 are transmitted through the coupling means 13 to the damped shaft 11 and to the damping means 15 and absorbed therein. By absorbing the displacements with the damped shaft 11 and the damping means 15, the torque shaft 12, which is attached to the driving shaft 10 at the node point 16, will transmit the power to the driven mechanism while remaining substantially free of displacements which are normally inherent in a shaft driven at supercritical speeds.

What is claimed is:

1. A power transmission system operating in a critical speed range comprising:
   a drive shaft;
   a dual drive means; and
   a coupling means securing said dual drive means to said drive shaft in longitudinal relationship to provide a combined drive system, said coupling means being positioned adjoining a nodal point in said combined drive system.

2. A power transmission system in accordance with claim 1 wherein said dual drive means comprises:
   an inner torque shaft; and
   an outer shaft mounted concentrically about a portion of the length of said inner torque shaft.

3. A power transmission system operating in a critical speed range comprising:
   a drive shaft;
   a dual drive means;
   a coupling means securing said dual drive means to said drive shaft in longitudinal relationship to provide a combined drive system, said coupling being positioned at a nodal point in said combined drive system; and
   a damping means mounted on said dual drive means, whereby deflections in said dual drive means are absorbed by said damping means.

4. A power transmission system in accordance with claim 3 wherein said dual drive means comprises:
   an inner torque shaft; and
   an outer shaft mounted concentrically about a portion of the length of said inner torque shaft.

5. A power transmission system in accordance with claim 4 wherein said damping means is mounted on said outer shaft at a point which provides an antinode.

6. A power transmission system in accordance with claim 5 wherein said damping means is mounted on the free end of said outer shaft.

7. A power transmission system in accordance with claim 6 wherein said damping means is a viscous shear damper.

8. A power transmission system in accordance with claim 7 wherein said damping means comprises:
   a plurality of bimetallic inner damper discs;
   a plurality of bimetallic outer damper discs mounted in spaced, complementary interleaved relationship to said inner damper discs;
   a liquid-tight compartment for containing said inner and outer damper discs; and
   a damping fluid disposed within said compartment and substantially filling the space between said interleaved damper discs, whereby the damping rate of said damping means is proportional to the resistance of said damping fluid to shear and said bimetallic damper discs automatically compensate for changes in the viscosity of said damping fluid.

9. A damping means comprising:
   a plurality of inner damper discs; a plurality of outer damper discs mounted in spaced, complementary interleaved relationship to said inner damper discs;
   a liquid-tight compartment for containing said inner and said outer damper discs;
   a damping fluid disposed within said compartment and substantially filling the space between said interleaved damper discs; and
   a means for automatically adjusting said space between said interleaved damper discs in accordance with a change in the viscosity of said damping fluid, whereby the damping rate of said damping means is proportional to the resistance of said damping fluid to shear.

10. A damping means in accordance with claim 9 wherein said inner and said outer damper discs are constructed of a bimetallic material.

11. A damping means in accordance with claim 10 wherein said inner and said outer bimetallic damper discs deflect in proportion to temperature changes, whereby the space between adjacent complementary discs decreases with an increase in the temperature of said damping fluid.

12. A supercritical power transmission system comprising:
   a drive shaft;
   a dual drive means comprising an inner torque shaft and an outer shaft mounted concentrically about a portion of the length of said inner torque shaft;
   a coupling means securing said dual drive means to said drive shaft in longitudinal relationship to provide a combined drive system, said coupling means being positioned at a nodal point on said combined drive system; and
   a damping means mounted on the free end of said outer shaft, said damping means comprising:
   (a) a plurality of bimetallic inner damper discs;
   (b) a plurality of bimetallic outer damper discs mounted in spaced, complementary interleaved relationship to said inner damper discs;
   (c) a liquid-tight compartment for containing said inner and said outer damper discs; and
   (d) a damping fluid disposed within said compartment and substantially filling the space between said interleaved damper discs, whereby the damping rate of said damping means is proportional to the resistance of said damping fluid to shear and said bimetallic damper discs automatically compensate for changes in the viscosity of said damping fluid.

References Cited

UNITED STATES PATENTS

| 830,742 | 9/1906 | Reichenbach | 64—1 |
| 1,807,798 | 6/1931 | Short | 64—27 |
| 1,918,249 | 7/1933 | Dashefsky | 74—574 X |
| 1,961,679 | 6/1934 | Walti | 64—1 |
| 2,013,109 | 9/1935 | Reynolds | 74—574 X |
| 2,331,160 | 10/1943 | Baker et al. | 74—574 X |
| 2,346,432 | 4/1944 | Heintz | 64—1 |
| 2,889,695 | 6/1959 | Moeller | 64—1 |

HALL C. COE, *Primary Examiner.*

U.S. Cl. X.R.
74—574; 180—70